United States Patent [19]

Smalls et al.

[11] Patent Number: 4,460,117
[45] Date of Patent: Jul. 17, 1984

[54] FISHING POLE HOLDER FOR AUTOMOTIVE VEHICLES

[76] Inventors: Joe C. Smalls; Franklin R. Smalls, both of 114 Colleton Loop, Walterboro, S.C. 29488

[21] Appl. No.: 490,447

[22] Filed: May 2, 1983

[51] Int. Cl.³ .............................................. B60R 9/12
[52] U.S. Cl. .................................. 224/324; 224/322; 224/922
[58] Field of Search ............... 224/324, 309, 322, 323, 224/329, 917, 922

[56] References Cited

U.S. PATENT DOCUMENTS

| | | | |
|---|---|---|---|
| 2,173,953 | 9/1939 | Schiwisow | 224/324 X |
| 2,907,506 | 10/1959 | Sammons | 224/324 X |
| 3,524,572 | 8/1970 | Hall | 224/922 X |
| 4,084,735 | 4/1978 | Kappas | 224/324 X |

FOREIGN PATENT DOCUMENTS 2482538  11/1981  France ................................ 224/322

Primary Examiner—Steven M. Pollard

[57] ABSTRACT

This fishing pole holder is designed to be quickly and easily attached to the roof of automobiles or trucks. Primarily, it consists of a plastic rack, which includes springs and eyes to hold fishing poles safely and securely, without damage to the poles or the car. It also includes a strap for fastening the device to the car, and the windows of the car may be closed on the strap without rain or snow coming into the car.

1 Claim, 3 Drawing Figures

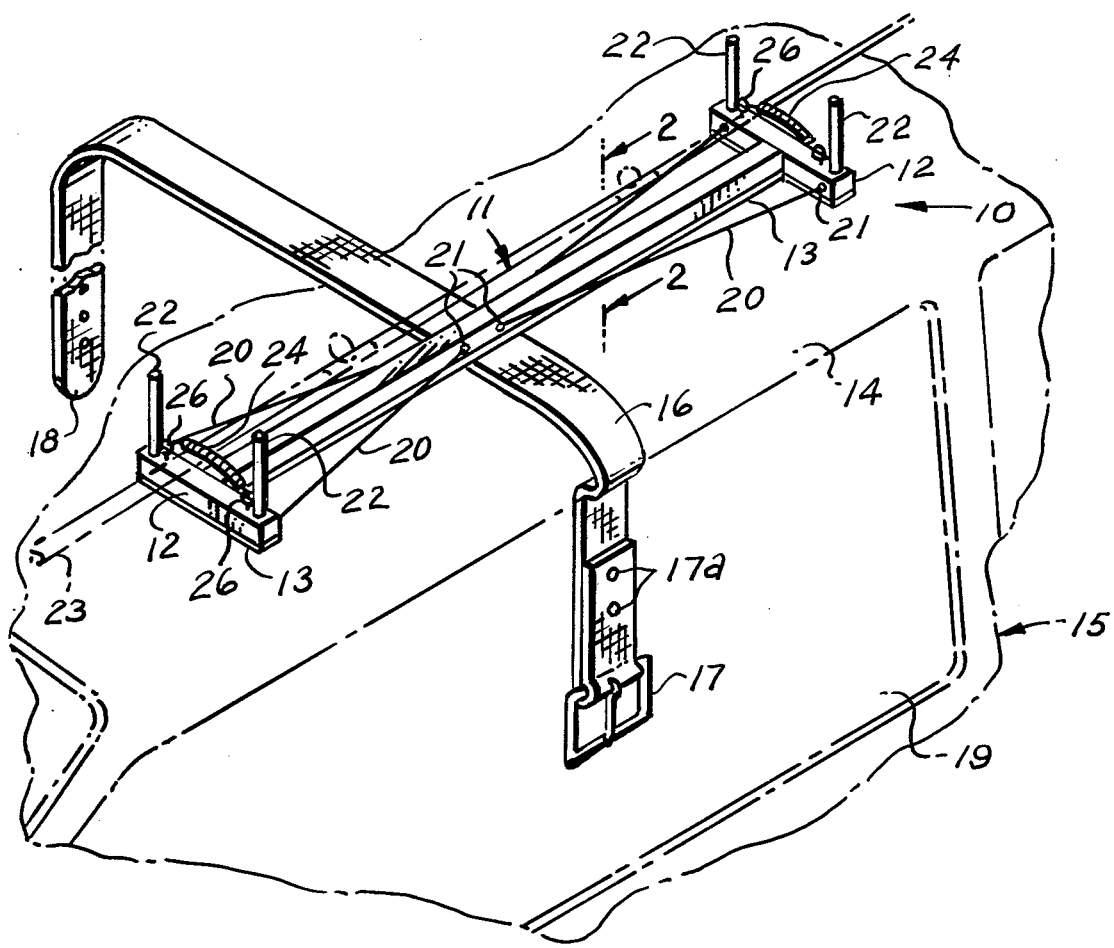
FIG.1
FIG.2
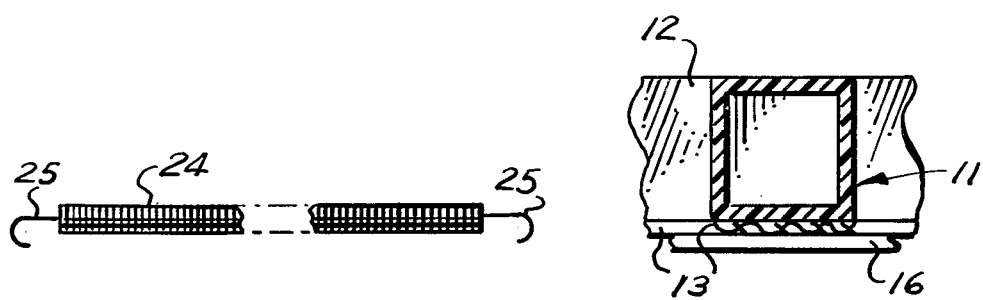
FIG.3

FISHING POLE HOLDER FOR AUTOMOTIVE VEHICLES

This invention relates to roof top carrying devices for automotive vehicles, and more particularly, to a fishing pole holder for automotive vehicles.

The principal object of this invention is to provide a fishing pole holder for automotive vehicles, which will be easily attached to, and removed from, the tops of cars, trucks, and the like.

Another object of this invention is to provide a fishing pole holder for automotive vehicles, which will fit all vehicles, and it will include a belt that will be received through the windows, while enabling the windows to be closed during inclement or cold weather.

Another object of this invention is to provide a fishing pole holder for automotive vehicles, which will have its belt member placed over the top of the vehicle and through the doors over the top rear of the front seat, where the buckle may fasten it together.

A further object of this invention is to provide a fishing pole holder for automotive vehicles, which, in the event the vehicle is a four-door model, the belt may be brought through the rear doors and buckle together in front of the passengers in the rear seat.

Other objects are to provide a fishing pole holder for automotive vehicles, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, showing a fragmentary and phantom fishing pole secured therein, and illustrating an automotive vehicle fragmentary and in phantom lines;

FIG. 2 is an enlarged cross-sectional view, taken along the line 2—2 of FIG. 1, and FIG. 3 is a plan view of one of the hold-down springs, shown on a slightly enlarged scale, and removed from FIG. 1.

According to this invention, a fishing pole holder 10 is shown to include an elongated bar 11 of square cross-sectional configuration, preferably fabricated of a suitable rigid plastic material. A strip of suitable padding 13 is adhered, in a suitable manner, to the bottom side of bar 11, so as to protect the top 14 of the vehicle 15. A belt 16 includes a buckle 17, which is fastened thereto by a pair of suitable fasteners 17a, so as to receive adjustably the end 18. Belt 16 is fabricated of a suitable thin webbed material, so as to be received over the tops of oppositely opposed windows 19 of vehicle 15, when they are fully closed, as is illustrated in FIG. 1 of the drawing. A plurality of suitable cords or wires 20 are fixedly secured, at one end, to suitable fasteners 21 at the center sides of bar 11, and to the ends of the cross bars 12 by similar fasteners 21, so as to provide maximum strength for holder 10, and the bars 12 also serve to stabilize holder 10 laterally on the top 14 of vehicle 15. A pair of dowel posts 22 are fixedly secured in the top portions of both of the cross bars 12, so as to retain a fishing pole or poles 23 within their confines, both front and rear of holder 10. A coil spring 24, having a hook 25 on each end, releasably engages with a pair of eyes 26, which are fixedly secured in the tops of cross bars 12. The springs 24 serve to hold the fishing poles 23 stationary on top of holder 10, when vehicle 15 is in transport.

In use, holder 10 is placed on the top 14 of vehicle 15, with the padding material 13 on the bottom side, engaging with the top 14. The belt 16 is then passed through the windows 19 of vehicle 15, and the end 18 is received in buckle 17, and adjustably secured, to render holder 10 stationary. The pole or poles 23, then positioned between the dowel posts 22 and the springs 24, are then engaged by their hooks 25, to the eyes 26 which will keep them in place until it is desired to remove poles 23.

While various changes may be made in the detail construction, it is understood that such changes will be within the spirit and scope of the present invention, as is defined by the appended claims.

What we now claim is:

1. A fishing pole holder for automotive vehicles, comprising, in combination, an elongated bar, a cross bar fixedly secured at each opposite end of said elongated bar, a belt extending transversely to said elongated bar being secured to the bottom thereof, for being removably received through opposite side windows of an automotive vehicle when said holder is placed upon the roof thereof, a pad on the bottom of said elongated bar and said cross bars for resting against said roof, an upright dowel near each opposite end of each said cross bar defining upon each said cross bar a space therebetween for receiving fishing poles; and a coil spring upon each said cross bar, extending between said dowels, being secured at opposite ends to eyes mounted upon said cross bar for said fishing poles to rest between coil turns of said spring.

* * * * *